United States Patent [19]
Swendseid

[11] Patent Number: 5,505,161
[45] Date of Patent: Apr. 9, 1996

[54] PENDANT PET TOY

[75] Inventor: Tyse Swendseid, Ojai, Calif.

[73] Assignee: Ehtical Products, Inc., Newark, N.J.

[21] Appl. No.: 416,138

[22] Filed: Apr. 4, 1995

[51] Int. Cl.$^6$ .................................................. A01K 13/00
[52] U.S. Cl. ........................................ 119/708; 446/227
[58] Field of Search .................................. 119/707, 708, 119/711; 446/227; 482/90; 273/26 E, 58 C, 413

[56] References Cited

U.S. PATENT DOCUMENTS

| | | | |
|---|---|---|---|
| 810,900 | 1/1906 | Bartlett | 446/227 |
| 2,330,538 | 9/1943 | Allen | 446/227 |
| 3,039,159 | 6/1962 | Burke | 446/227 |
| 4,073,490 | 2/1978 | Feather | 482/90 |
| 4,438,727 | 3/1984 | Thompson | 119/708 |
| 5,148,769 | 9/1992 | Zelinger | 119/708 |

*Primary Examiner*—Todd E. Manahan
*Attorney, Agent, or Firm*—Helfgott & Karas

[57] ABSTRACT

A toy such as a stuffed mouse is mounted above a floor by an elastic cord attached to a resilient clamp. The clamp is adapted to grip opposite sides of a wall or door frame to suspend the toy in midair. A length adjustment member is provided for changing or adjusting the height and response of the toy to suit the play preference of a particular pet.

11 Claims, 1 Drawing Sheet

PENDANT PET TOY

BACKGROUND OF THE INVENTION

1. Field of the Invention

The present invention relates in general to an amusement device and particularly relates to a pendulous pet toy having a resilient mounting clamp for suspending the toy from a door frame.

2. Description of Prior Developments

Toys for amusing pets are well known and have been in use for many years. Artificial mice, rubber and plastic balls, rattles, bells and stuffed articles, such as balls and bags stuffed with cloth and catnip, are some of the types of conventional pet toys currently in use.

Although cats, dogs and other pets do play with these toys by swatting, pushing and carrying them about, most pets seem to prefer a toy which appears alive and appears to move on its own without continuous contact with the pet.

An example of such a pet toy can take the form of a hand held wand having a string attached to one of its ends and a toy attached to the loose end of the string. As the pet owner moves the wand and thereby manipulates the string, the toy appears to move about as if alive.

Unfortunately for the pet owner, the use of such human powered and human operated toys can become tiresome even though the pet may show continued interest in playing. Such toys suffer from the additional drawback in that the pet may not be interested in playing with the toy at the same time the pet owner takes the opportunity to manipulate the toy. The result is often a pet toy which goes unused or discarded.

Another drawback associated with conventional pet toys is the potential they pose for causing slip and fall accidents. It is difficult to keep track of pet toys which are knocked about or carried from place to place. Most pet owners or their guests would not appreciate stepping on a hard ball or tripping over a mechanical wind-up mouse.

Accordingly, a need exists for a pet toy which appears self-animated without extensive contact with a pet yet which does not require actuation by or the presence of the pet owner. A further need exists for such a toy which does not pose a threat of causing a slip and fall accident and which maintains its position at a predetermined location.

SUMMARY OF THE INVENTION

The present invention has been developed to overcome the problems and fulfill the needs noted above as well as to provide additional benefits discussed in detail hereinbelow.

A primary object of the invention is to provide an amusement device such as a pet toy which appears alive yet which limits its movement to a predetermined area.

Another object of the invention is to provide a pet toy which is easy to use, easy to install and which does not require the presence of the pet owner to operate.

Yet another object of the invention is to provide a pet toy which may be suspended above the floor so as to avoid the possibility of a slip and fall accident.

Still another object of the invention is to provide a pet-actuated toy which exhibits a complex movement which combines bouncing, swinging and vibratory motions.

These and other objects are met by the present invention which includes a pet toy suspended from a string, ribbon, elastic cord or any other suitable tether. One end of the tether is attached to the toy and the other end is attached to a pincher-like clamp for suspending the toy from an elevated mount such as a lintel on a door frame.

The clamp may take the form of a resilient wire or springy plastic rod having a somewhat U-shaped or V-shaped profile. The tether, which may include a length adjusting member, may be formed of a core of rubber or elastic similar to that used with rubber bands. The tether core may be provided with a protective fabric sheath.

Any type of toy may be attached to the free end of the tether. For example, an artificial bird or mouse, a ball, bell, bone or any other pet-attracting article may be used. The toy may be stuffed or scented with catnip or any other scent to further attract a pet, particularly a cat.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
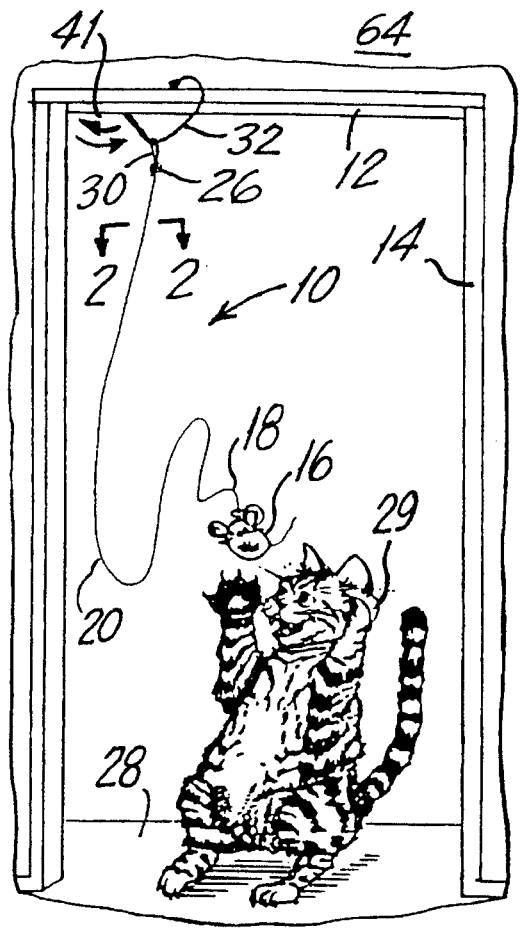
FIG. 1 is a schematic perspective view of one embodiment of the invention shown mounted to the lintel of a door frame.

The present invention will now be described in conjunction with the drawings, beginning with FIG. 1 which shows an animal amusement device 10 mounted to the lintel 12 of a door frame 14. The amusement device 10 includes an amusement object or toy 16 attached to the free or lower end 18 of tether 20.

Toy 16 may be attached to the tether 20 in any suitable manner such as by sewing, gluing, stapling or tying. Alternatively, the tether may be threaded through the body of the toy with a needle and knotted at its free end to prevent it from slipping back through the toy body.

Tether 20 may be a string, cord, line, ribbon, spring or any other flexible member. Preferably, tether 20 is a resilient elastomeric cord formed of natural or synthetic rubber of the type commonly known as bungee cord and having a total length of about six feet.

Figure 2:
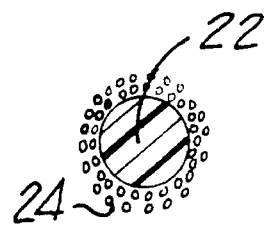
FIG. 2 is a view in radial cross section taken along line 2—2 of FIG. 1 showing details of an elastic tether.

As seen in FIG. 2, the elastic core 22 of tether 20 is encapsulated in a protective stretchable multi-strand fabric sheath 24 to prevent or reduce damage to the core by biting and clawing.

A length adjusting member, such as button 26 may be provided as shown in FIG. 1 to vary the length of the tether 20 and thereby adjust the height of the toy 16 above the floor 28 to suit the height or preference of a particular pet 29. By adjusting the height of the toy 16 above the floor 28, the dynamic action or response of the toy may also be adjusted.

For example, a long tether will deflect and stretch easily when grabbed while a shorter tether will provide greater resistance to stretching and a quicker and stronger snap back return. Moreover, a longer tether will swing through a greater arc than a shorter tether and generally react slower.

Figure 3:
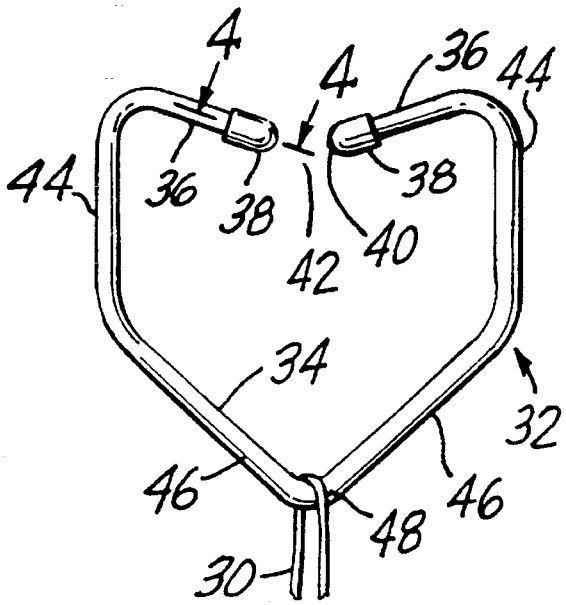
FIG. 3 is an enlarged elevation view of the clamp of FIG. 1.

The other or top end 30 of tether 20 is secured to or looped over a mounting member or clamp 32. Clamp 32, as shown in FIG. 3, includes a resilient one-piece metal or plastic clamp rod 34 having a somewhat U-shaped or V-shaped profile. The free end portion 36 of clamp rod 34 may be covered with protective caps 38 formed of plastic or elastomeric material. Caps 38 preferably have a dome shaped tip 40 for facilitating the pivoting or swinging motion of the clamp about door frame 14 as shown by arrows 41 in FIG. 1.

Clamp rod 34 is shaped such that its end portions 36 generally face or oppose one another across a gap 42 when mounted to a door or other overhead support. The end portions 36 extend into somewhat parallel yet curved side portions 44 which in turn extend into base portions 46 which meet at a central vertex 48, and together define a generally V-shaped clamp base.

The vertex 48 provides a central mounting point for centering tether 20 with respect to the clamp and with respect to a door frame. Vertex 48 also serves as a central point about which the free ends 36 pivot and deflect during installation. Such centering of the tether on the clamp rod enhances the swinging action of the clamp about the door frame and thereby increases the movement of the tether and toy. This in turn provides a more life-like action to the toy.

Figure 4:
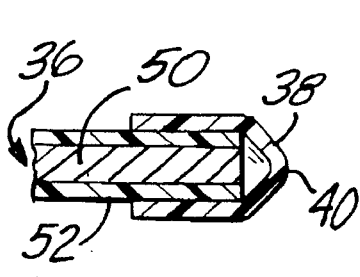
FIG. 4 is a view in axial cross section of a clamp rod and end cap taken along line 4—4 of FIG. 3.

Details of one embodiment of the clamp rod end portions 36 and end caps are shown in FIG. 4 wherein clamp rod 34 includes a central resilient metal wire core 50 of the type similar to that used in the fabrication of coat hangers. Core 50 may be of a steel or aluminum alloy composition. A protective and decorative plastic coating 52 surrounds core 50. Such plastic coated wire is commercially available and may be easily cut to length and bent in a conventional manner in a wire bending jig to take the form shown in FIG. 3.

End cap 38 is a commercially available plastic fitting which slides over the end of each end portion 36 of clamp rod 34 with a slight interference fit. The tip 40 of each end cap 38 is generally domed or pointed to provide a low friction, nonabrasive pivot point about which the entire amusement device 10 pivots and swings. Such swinging adds to the animation of the toy 16 when the toy is moved by a pet and helps to keep the toy moving after its initial movement.

Figure 5:
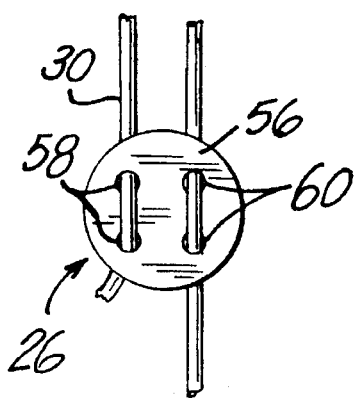
FIG. 5 is a front elevation view of the adjusting member of FIG. 1.
Figure 6:
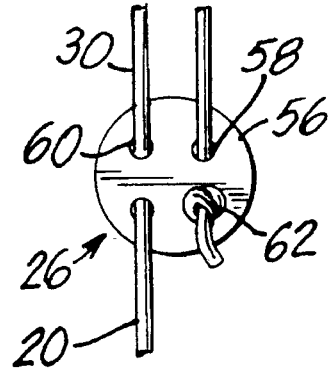
FIG. 6 is a rear elevation view of the adjusting member of FIG. 1.

An example of one embodiment of adjusting member 26 is shown in FIGS. 5 and 6 wherein a four-hole button 56 receives one side or leg of looped end 30 through two holes 58 and the other side or leg of the looped end through an adjacent parallel pair of holes 60. A simple knot 62 maintains the button 56 in position on the tether 20 as seen in FIG. 6.

All that is required to adjust the length of the tether is to slide the button up or down along tether 20 to increase or decrease the size of the loop formed over and around vertex 48 of clamp 32. Alternatively, the tether may be pulled in either direction through holes 60 while maintaining the button in place against knot 62.

The amusement device may be easily mounted to any secure overhead support but is particularly adapted for mounting to the lintel of a door frame as shown in FIG. 1. The clamp 32 is simply resiliently deflected or spread apart as in the manner of a stethoscope to increase the length of gap 42 (FIG. 2) to the point where the end caps 38 can pass over each edge of lintel 12. Clamp 32 is then released allowing the tips 40 of end caps 38 to spring back to grip the opposite sides of wall 64 (FIG. 1) so as to provide a pair of swinging anchor points for suspending toy 16 above floor 28.

The plastic end caps 38 and plastic coating 52 which cover the wire core 50 of clamp rod 34 prevent abrasion of and damage to the walls, door frames or any other mounting surface.

In use, a pet may grab, bite or swat toy 16, or simply brush against it causing it to swing back and forth as well as to bob up and down somewhat unpredictably. The more rigorous the contact with the toy, the greater its displacement and deflection. Once activated, the toy 16 will maintain its complex movement for quite some time thereby giving the pet the perception that the toy is alive. This increases the pet's interest in the toy and encourages the pet to continue in its play.

There has been disclosed heretofore the best embodiment of the invention presently contemplated. However, it is to be understood that various changes and modifications may be made thereto without departing from the spirit of the invention.

What is claimed is:

1. An amusement device, comprising:

a clamp having a pair of resilient free end portions each respectively adapted for resiliently engaging a mounting surface;

an adjustable length tether comprising an elastic cord covered by a protective stretchable fabric sheath and having a first end portion connected to said clamp and a second free end portion;

a length adjusting member connected to said tether for changing the length of said tether; and an amusement device connected to said second free end portion of said tether.

2. The device of claim 1, wherein said clamp comprises a one-piece wire rod covered with a plastic coating, and a plastic end cap fitted over each free end portion of said clamp, each said end cap comprising a dome-shaped tip.

3. The device of claim 1, wherein said length adjusting member comprises a four-hole button.

4. The device of claim 1, wherein said first end portion of said tether is looped over said clamp and secured to said length adjusting member.

5. The device of claim 1, wherein said amusement device comprises a toy mouse.

6. The device of claim 1, wherein said pair of clamp free end portions respectively extend into a pair of clamp side portions which respectively extend into a pair of clamp base portions, said pair of clamp base portions defining a vertex about which said first end portion of said tether is supported.

7. A pet amusement device adapted for mounting to a lintel of a door frame, comprising:

a resilient clamp comprising a one-piece resilient wire rod covered with a plastic coating, said clamp defining a pair of generally opposed free end portions at opposite ends of said one-piece resilient wire rod, each free end portion being fitted with a protective cap for engaging said door frame;

a tether comprising an elastic cord covered by a protective stretchable sheath connected to said clamp; and a pet toy connected to said tether.

8. The device of claim 7, wherein said tether comprises an adjustable length tether and wherein said device further comprises a length adjusting member for adjusting the length of said tether.

9. The device of claim 8, wherein said tether is looped over said clamp and connected to said length adjusting member.

10. A pendant pet amusement device mountable to an overhead support having opposite side walls, comprising:

a clamp comprising a one-piece resilient rod having a pair of opposed free ends respectively positionable adjacent said opposite side walls and defining a gap therebetween and further defining a central V-shaped support portion aligned centrally with respect to said gap;

an elastic tether looped around said V-shaped support portion;

a length adjustment member connected to said tether for adjusting the length of said tether; and a pet toy connected to said tether and suspendable from said support such that, at rest, said toy is naturally centered directly below said V-shaped portion of clamp in a pendulous manner.

11. The device of claim 10, further comprising a pair of dome shaped end caps respectively fitted over said pair of opposed free ends of said clamp.

* * * * *